(No Model.)
W. F. WITHERELL & B. H. VARY.
MACHINE FOR DRYING, CLEANING, AND CALCINING GRAIN AND OTHER SUBSTANCES.
No. 268,587. Patented Dec. 5, 1882.
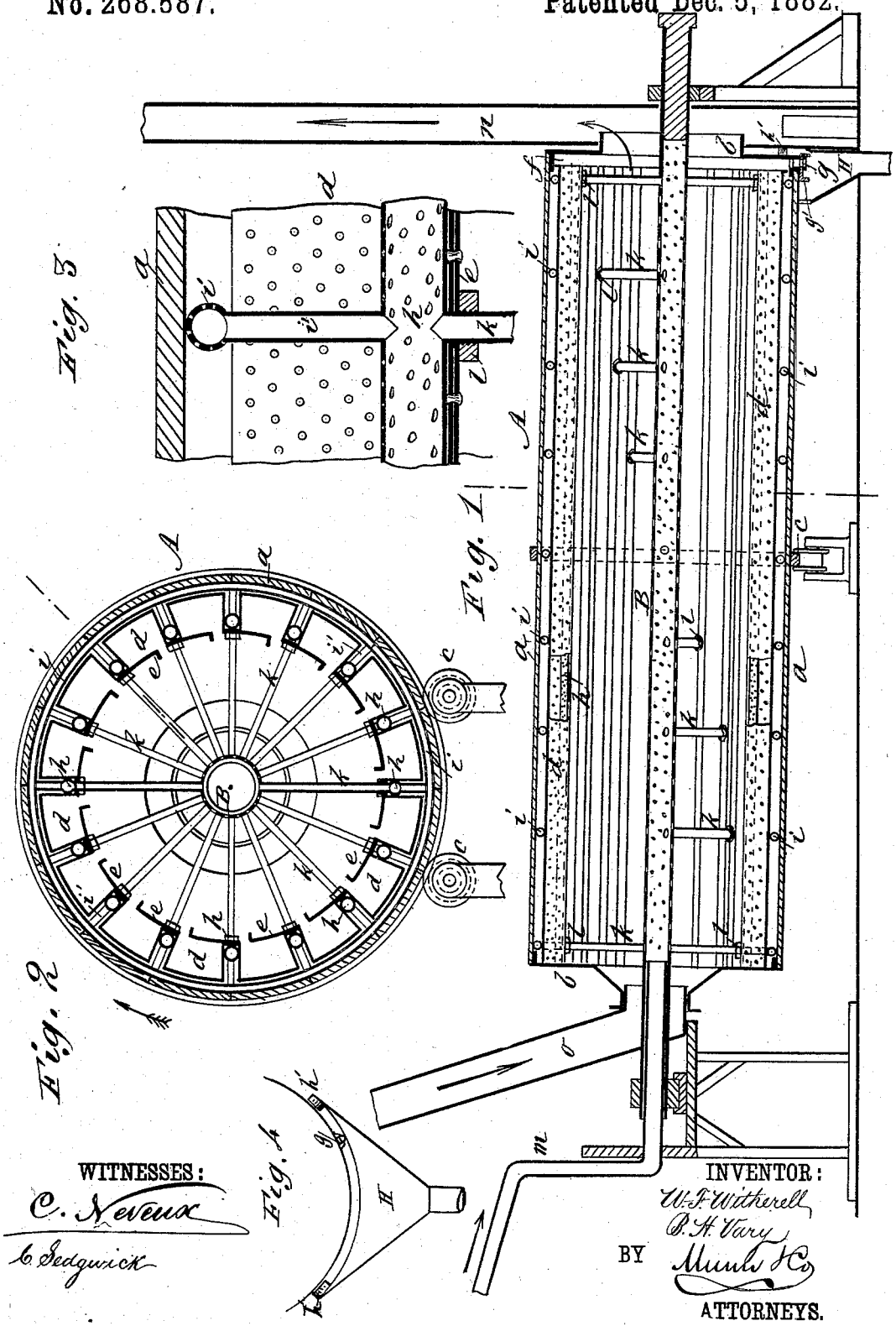
WITNESSES:
C. Neveux
C. Sedgwick
INVENTOR:
W. F. Witherell
B. H. Vary
BY Munn & Co
ATTORNEYS.

UNITED STATES PATENT OFFICE.

WILLIAM F. WITHERELL AND BENNETT H. VARY, OF CHICAGO, ILLINOIS.

MACHINE FOR DRYING, CLEANING, AND CALCINING GRAIN AND OTHER SUBSTANCES.

SPECIFICATION forming part of Letters Patent No. 268,587, dated December 5, 1882.

Application filed August 2, 1882. (No model.)

*To all whom it may concern:*

Be it known that we, WILLIAM F. WITHERELL and BENNETT H. VARY, both of Chicago, in the county of Cook and State of Illinois, have invented a new and useful Improvement in Machines for Drying, Cleaning, and Calcining Grain and other Substances, of which the following is a full, clear, and exact description.

Our invention consists in a revolving hollow cylindrical drier supported in a nearly-horizontal position, and provided with hot-air tubes and with buckets for distributing the material to be dried or cleaned.

It also consists in certain novel features of construction, all as hereinafter described and claimed.

Reference is to be had to the accompanying drawings, forming a part of this specification, in which similar letters of reference indicate corresponding parts in all the figures.

Figure 1 is a vertical longitudinal sectional view of our improved machine. Fig. 2 is a transverse section of the same, and Fig. 3 is a detail view in larger size. Fig. 4 is a view of the discharge-hopper.

A is the cylinder, the shell of which is made of sheet or rolled iron surrounded by an outer jacketing, $a$, of wood, and closed at its ends by heads $b\ b$, which are constructed for the feed and delivery of the material, as hereinafter set forth. The cylinder A is fitted upon a hollow axle, B, which is supported outside of the ends of the cylinder in suitable bearings, the axle being provided with hollow sleeves at the bearings. The cylinder is set with its lower or delivery end slightly lower than the feed end, in order to insure a forward movement of the material. At its mid-length it is supported by rollers $c$, which serve to sustain the weight, said rollers being flanged to prevent longitudinal movement of the cylinder.

The construction of the cylinder and arrangement of the air-pipes are as follows:

The shell is made with depressions $d$, extending from its upper or feed end and terminating near the lower end of the cylinder, and these depressions form a series of buckets around the shell, having perforated sides, as shown in Fig. 2. Within the cylinder, and secured to the projections between the buckets $d$, are plates $e$, and these plates partially cover the openings of the buckets. They are also formed with their edges that extend over the buckets bent or flanged inwardly, as shown at $e'$, the flanges being formed radially to the cylinder. The object of these flanges or projections is to spread the grain more thoroughly and cause it to fall in thin sheets toward the center of the cylinder. The buckets $d$ terminate a short distance from the lower or delivery end of the cylinder, and beyond their ends the shell is left to the full size of the outer diameter, so that a trough, $f$, is formed for gathering the material, and from the trough $f$ a pipe, $g$, extends for discharge of the material into the hopper. The pipe $g$ is provided with a valve, $g'$, and in the hopper H are provided blocks $h'$, having their faces inclined in opposite directions, whereby as the pipe $g$ enters the hopper the valve is opened and the grain discharged from the trough $f$, and before the said pipe leaves the hopper the valve is closed. The hollow axle B is closed at the discharge end of the cylinder, and is formed with perforations in its portion within the cylinder to allow escape of hot air.

In the space between the buckets $d$, and at the outside of the shell, are small air-pipes $h$, which extend from the feed end of the cylinder to the gathering-trough $f$. These pipes are plugged at both ends, and are perforated laterally. Around the shell, and resting upon its surface, are pipes $i$, which are set at suitable distances apart to form supports for the wooden jacketing of the cylinder. These pipes are perforated, and are connected by short sections $i'$ with the pipes $h$ in the depressions of the shell. From the hollow axle B to the pipes $h$ extend tubes K K in such a number and in such location as to form a series of spokes that carry the shell of the cylinder. These hollow spokes pass through the shell, where they are fitted with nuts $l$ to form a support for the shell. By these pipes K the whole series of pipes is connected, so that the hot air applied to the hollow axle by a hot-air pipe, as shown at $m$, passes to the pipes $h\ i$. The object of the outer pipes, $i$, is to heat the air in a space between the shell and the surrounding jacket, as well as to heat the shell itself, so as to obtain a heating-surface that will cause evaporation from the material while it is in the buckets.

The heads b b are formed to receive the ends of the wooden jacketing, and the jacket is firmly banded to the iron cylinder and pipes, so that it serves to prevent radiation of heat. The middle band is formed to serve as a bearing-track for the rollers c. The head b at the feed end of the cylinder is formed in cone or funnel shape to receive and surround the feed-pipe o, around the end of which the head revolves. The lower head is apertured for escape of air, and is formed with flanges around a central aperture that opens into the walls of a dust-flue, n.

The feed-pipe o will extend from a hopper provided with a screw or other suitable device for supplying the material regularly. This feed-pipe, where it enters the cylinder, is of sufficient size to allow the axle B to pass through it and not interfere with the passage of the grain. The hot air is to be supplied by means of a blower from the heating-furnace, located at any suitable point and of any suitable construction. When the material is to be simply cooled without drying heated air will not be required, and when drying and cooling are simultaneously required a second cylinder will be provided, and the material from the first or drying cylinder will be discharged by suitable devices into this second cylinder, which will be supplied with cold air only.

The operation of the machine is as follows: As the grain enters the funnel-shaped head it falls to the bottom, and is received in the buckets of the cylinder, by which it is carried upward. At the upper side, and after passing the center line, the material is discharged from the buckets, and by the action of the flanged plates is spread in thin sheets and projected toward the center of the cylinder. In falling it passes through the heated air, and is arrested again upon the bottom or under side of the cylinder, but in advance of the starting-point, the distance depending upon the inclination of the cylinder. The material is again carried up and again falls, and the operation continues until the material reaches the gathering-trough f and is discharged. By the action of the heated air and heated surface of the cylinder the material soon obtains a degree of heat which causes rapid evaporation, so that it is fully dried by the time it is discharged. By the attrition of the particles, in the case of grain, the adherent dust and smut are loosened and carried away by the drafts through the cylinder. The outward and inward projections of the iron shell, by which the buckets a are formed, are provided with numerous holes, so as to secure an inward circulation of air through the grain while it is in the buckets.

Having thus described our invention, we claim as new and desire to secure by Letters Patent—

1. The grain-drier cylinder A, having its shell formed with longitudinal depressions or buckets d, having perforated sides and adapted to receive steam-pipes between them, substantially as herein shown and described.

2. In a grain drier, the combination, with the cylinder A, having its shell provided with longitudinal depressions or buckets d, of the plates e, partially closing the buckets, and provided with inwardly-projecting flanges e', substantially as and for the purpose set forth.

3. In a grain-drier, the combination, with the hollow axle B and the longitudinal buckets d, having perforated sides, of the heating-pipes h, arranged in the space between said buckets, and connected to said hollow axle, substantially as and for the purpose set forth.

4. The combination of the pipe g and valve g' with the hopper H and blocks h', said blocks having inclined faces, substantially as shown and described, and for the purposes set forth.

5. In a grain-drier, the combination, with the jacketed cylinder A, having a series of longitudinal buckets, d, and the heating-pipes h, arranged between said buckets, of the pipes i, arranged between the jacket and the shell, and connected to the pipes h, substantially as and for the purpose set forth.

6. In grain-driers, the combination and arrangement of the hollow air-pipes B, the exterior pipes, h i, and the hollow spokes K, substantially as shown and described.

WILLIAM F. WITHERELL.
BENNETT HULL VARY.

Witnesses to W. F. Witherell:
W. H. SEAMANS,
M. L. GEROULD.
Witnesses to B. H. Vary:
HEYMAN LEVIN,
JOHN VARY.